Patented July 25, 1950

2,516,112

UNITED STATES PATENT OFFICE 2,516,112

SEPARATION OF SAPONIFIED AND UNSAPONIFIABLE PORTIONS OF FATS AND OILS

Milton Freiman, Chicago, Ill., assignor to Vitamins, Inc., a corporation of Illinois No Drawing. Application November 30, 1945, Serial No. 632,120

9 Claims. (Cl. 260—426)

This invention relates to the separation of saponified and unsaponifiable portions of fats and oils, and particularly to the concentration of vitamin-bearing fatty materials.

Vitamin materials normally occur in nature in fats and oils, the vitamin fraction being unsaponifiable. In practice, therefore, separation is accomplished by saponifying a saponifiable fraction of the fat or oil with aqueous caustic soda or potash, followed by solvent extraction with such solvents as petroleum ether, ethyl ether, or ethylene dichloride. The presence of the soap in the product causes obstinate emulsions to form which not only result in a long and difficult extraction procedure, but even at best produces unsatisfactory low yield, due, at least in a large part, to the occlusion of a considerable amount of the unsaponified material by the soap.

In another process saponification was accomplished by using an aqueous solution of potash containing traces of alcohol to form a viscous-solid soap. Here again, however, the extraction is difficult and the yields are low.

Alcoholic saponification has also been employed to create a liquid soap, but this requires large amounts of water and alcohol which are added after a preliminary saponification. This method requires special apparatus, including extraction columns or revolving baffles and careful adjustment of the specific gravities of the solvent and soap. Due to the large amount of liquid involved in this method, larger equipment is required and more solvent is left behind in the soap.

Other methods have been suggested but require greater saponification times and subsequent heat treatment as a preliminary to separation.

I have now discovered that separation may be easily accomplished without any special control or treatment providing an excess of finely divided inert solid material, capable of forming a filter bed, is mixed with the fatty material at a stage prior to separation in sufficient proportion to produce a mass which may readily be handled. The resulting mixture may then be utilized, for example, as a filter bed through which the solvents percolate, or as a means for readily separating the individual increments of the mixture so that good solvent contact may be had.

The invention may be utilized with animal, vegetable, or marine fats or oils, but has a special application to those in which the saponifiable fraction is considerably greater than the unsaponifiable fraction. Thus, it may be used on oils or fats that contain vitamins A, D, E, pro-vitamin A, or sterols such as ergosterol, cholesterol, and stigmasterol. The oils containing vitamin A and D are, among others, those oils derived from various fish and their livers such as shark, cod, dogfish, ling cod, rock cod, tuna, halibut, sole and other fish. Pro-vitamin A may be obtained from palm oil and carrot oil, and vitamin E from wheat germ or soya bean oil. Ergosterol may be obtained from yeast fat and ergot oil, cholesterol from fish oils, and stigmasterol from soy bean oil.

The preferred solid material is crystalline sodium sulfate of finely divided form as usually supplied in commerce. Any other inert material of suitable physical characteristics may be employed. The term "inert" is used to define the relationship of the solid product to the desired end material.

Suitable solid materials are sodium chloride, diatomaceous earth and other filter aid materials. Suitable diatomaceous earth is sold under the name "Hy-flo Super-Cel."

The solid material is most conveniently mixed with the fat or oil prior to saponification, but saponification may be carried on first and then the solid material added to the soapy mass. Likewise, of course, the solid material may be added in stages, some during and some after saponification.

The amount of solid is such as to produce a mass having suitable physical characteristics for handling—viz.—a percolatable mass. Normally, 4 parts by weight of solid for each part of oil produces good physical characteristics. The proportion will vary, however, in accordance with the nature of the solid, the state of division, the form of the particles, the proportion of saponifiable material and the liquidity of the oil. Fortunately no detailed advance tests need be made because even on the first operation of a particular oil, solid material is simply added until the proper consistency is reached. Once this stage has been attained, the amount of solid material can be increased further if desired without destroying the value of the process.

The amount of solvent used to percolate through the mixture for extraction is normally from 2 to 4 volumes for each volume of oil treated. After extraction, the solid mixture is preferably again treated from 3 to 5 times with fresh solvent. The preferred solvent is ethylene chloride. Other desirable solvents include propylene dichloride, methylene dichloride, cyclohexane and hexane.

According to Buxton, U. S. Patent 2,380,410, by adequate temperature control and regulation of saponification time, the amount of saponification may be regulated so as to partially saponify the oil and obtain a concentrate substantially in the form of vitamin esters—particularly if saponification is not carried beyond 75 to 80% completion. Partial concentrates produced by partial saponification are characterized by the fact that they are odorless or avoid a fishy taste, and have a lighter color than the fishy oil.

When treating vitamin A sources it is preferred not to carry the saponification to completion when the solid material is added before saponification, since a substantial part of the vitamin present may be destroyed by the complete saponification.

In carrying out the present process on vitamin bearing oils and fats air should be excluded and other oxidizing influences which might tend to destroy the vitamin content should be eliminated. Thus, it is preferred to de-aerate a solid material and to carry out the mixing and saponification in an inert atmosphere.

The following examples are given merely to illustrate the invention and are not to be construed in a limiting sense.

Example I 100 grams of rock cod liver oil, containing 173,200 units vitamin A per gram were mixed with 400 grams sodium sulfate and a solution of 30 grams potassium hydroxide in 15 grams water added. The mixture was heated under nitrogen with good agitation at 40–45° C. for 15 minutes, transferred to a percolator and 300 c. c. of ethylene dichloride allowed to percolate through. Five further washes with 250 c. c. portions of ethylene dichloride were then made, the combined extracts washed and the solvent removed under nitrogen in vacuo. There were obtained 46.8 grams of oil, each gram containing 362,800 units of vitamin A, making a vitamin A yield of 98.0%. The oil was clear, golden yellow in color, odorless, and devoid of fishy taste.

Example II 100 grams of shark liver oil containing 39,400 units vitamin A per gram were mixed with 400 grams of sodium sulfate and a solution of 30 grams caustic potash in 15 grams water added. The mixture was heated under nitrogen with good agitation at 45–50° C. for 25 minutes, transferred to a percolator, and 300 c. c. of ethylene dichloride allowed to percolate through. Five further washes with 250 c. c. portions of ethylene dichloride were then made, the combined extracts washed, and the solvent removed under nitrogen in vacuo. There were obtained 24.3 grams of oil, each gram containing 149,400 units of vitamin A, making a total vitamin A yield of 92.1%. The oil was clear, golden-yellow in color, ordorless, and devoid of fish taste.

Example III 100 grams of fish oil were mixed with 400 grams sodium sulfate and a solution of 30 grams caustic potash in 15 grams water added. The mixture was heated with good agitation for 40 minutes at 70–75° C., transferred to a percolator, and 300 c. c of ethylene dichloride allowed to percolate through. Three further washes with 250 c. c. portions of ethylene dichloride were then made, the combined extracts washed and the solvent removed under reduced pressure. The residue, after two crystallizations from methanol yielded 2.4 grams cholesterol melting at 145–147° C.

The cod liver oil, Example I, contained approximately 13½% unsaponifiable material. The shark liver oil, Example II, contained between 2 and 3% of unsaponifiable material.

The foregoing detailed description has been given for clearness of understanding only, and no unnecessary limitations should be understood therefrom.

What I claim as new, and desire to secure by Letters Patent, is:

1. In the saponification by means of a saponifying agent of vitamin bearing fats and oils containing saponifiable material and vitamin bearing unsaponifiable material and the separation of the saponified material from the unsaponified material, the method which comprises distributing the mixture of saponified and unsaponified material on an excess of a stable inert finely divided solid material in proportions to reduce the entire mass to percolatable consistency, and percolating a solvent for the unsaponified material through said mass.

2. The method as set forth in claim 1 in which the solid material is added prior to saponification.

3. The method as set forth in claim 1 in which the solid material is added in an amount considerably greater in weight than the fat or oil.

4. The method as set forth in claim 1 in which the solid material is crystalline sodium sulfate.

5. The method as set forth in claim 1 in which the solid includes a filter aid.

6. The method as set forth in claim 1 in which the fat or oil is cod liver oil.

7. The method as set forth in claim 1 in which the fat or oil is shark liver oil.

8. The method as set forth in claim 1 in which the fat or oil is fish oil.

9. In the saponification by means of a saponifying agent of vitamin bearing fats and oils containing a relatively large proportion of saponifiable material and a relatively small proportion of vitamin bearing unsaponifiable material and separating saponified material from unsaponified material, the method which comprises distributing the mixture of saponifiable and unsaponifiable material on four parts by weight of crystalline sodium sulfate per part of said mixture prior to the saponification of the saponifiable material, saponifying said saponifiable material, and percolating a solvent for the unsaponifiable material through the resulting mass.

MILTON FREIMAN.

REFERENCES CITED

The following references are of record in the file of this patent:

UNITED STATES PATENTS

| Number | Name | Date |
|---|---|---|
| 245,955 | Jaffe et al. | Aug. 24, 1881 |
| 1,705,824 | Odeen | Mar. 19, 1929 |
| 1,705,825 | Odeen | Mar. 19, 1929 |
| 1,745,851 | Hamilton et al. | Feb. 4, 1930 |
| 2,103,193 | Nichols | Dec. 21, 1937 |
| 2,128,083 | Ellis | Aug. 23, 1938 |
| 2,255,875 | Buxton et al. | Sept. 16, 1941 |
| 2,380,410 | Buxton | July 31, 1945 |
| 2,382,531 | Auer | Aug. 14, 1945 |

FOREIGN PATENTS

| Number | Country | Date |
|---|---|---|
| 118,100 | Australia | Feb. 3, 1944 |